(12) United States Patent
Igarashi et al.

(10) Patent No.: US 10,348,187 B2
(45) Date of Patent: *Jul. 9, 2019

(54) DC-DC CONVERTER HAVING A REVERSE FLOW PROTECTION FUNCTION

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Takashi Igarashi, Mie (JP); Byeongsu Jeong, Mie (JP); Kazuki Masuda, Mie (JP); Takanori Itou, Mie (JP); Seiji Takahashi, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/778,296

(22) PCT Filed: Dec. 8, 2016

(86) PCT No.: PCT/JP2016/086589
§ 371 (c)(1),
(2) Date: May 23, 2018

(87) PCT Pub. No.: WO2017/110510
PCT Pub. Date: Jun. 29, 2017

(65) Prior Publication Data
US 2018/0351448 A1 Dec. 6, 2018

(30) Foreign Application Priority Data
Dec. 25, 2015 (JP) .................. 2015-253741

(51) Int. Cl.
*H02M 1/32* (2007.01)
*H02M 3/158* (2006.01)
(Continued)

(52) U.S. Cl.
CPC ............ *H02M 1/32* (2013.01); *H02H 7/1213* (2013.01); *H02M 3/1584* (2013.01);
(Continued)

(58) Field of Classification Search
CPC ...... H02M 3/155; H02M 3/156; H02M 3/158; H02M 3/1588; H02M 2001/0009
See application file for complete search history.

(56) References Cited

U.S. PATENT DOCUMENTS 5,883,473 A * 3/1999 Li ...................... H05B 41/2855
315/209 R
6,252,357 B1 * 6/2001 Tanaka ............... H05B 41/2985
315/209 R
(Continued)

FOREIGN PATENT DOCUMENTS

JP 54-26038 2/1979
JP 2015-220926 12/2015

OTHER PUBLICATIONS

Search Report for PCT/JP2016/086589, dated Jan. 17, 2017.

*Primary Examiner* — Jue Zhang
*Assistant Examiner* — Lakaisha Jackson
(74) *Attorney, Agent, or Firm* — Honigman LLP (57) ABSTRACT

The present invention realizes a DC-DC converter that is provided with a reverse flow protection function, while reducing conduction loss. A DC-DC converter includes: a voltage conversion unit that steps down a voltage applied to a first conductive path and output the resulting voltage to a second conductive path; a reverse flow state detection unit that detects a reverse flow state of a current flowing through
(Continued)

the second conductive path; and a reverse protection control unit that performs a protecting operation when a current flows in a reverse direction. A switching element is provided on a third conductive path that is located between a voltage conversion unit and a reference conductive path, and the reverse protection control unit operates to switch the switching element to an OFF state upon a reverse flow state being detected.

4 Claims, 3 Drawing Sheets

(51) Int. Cl.
*H02H 7/12* (2006.01)
*H02M 1/00* (2006.01)

(52) U.S. Cl.
CPC .. *H02M 3/1588* (2013.01); *H02M 2001/0009* (2013.01); *H02M 2001/0048* (2013.01); *H02M 2003/1586* (2013.01); *Y02B 70/1466* (2013.01); *Y02B 70/1491* (2013.01)

(56) References Cited

U.S. PATENT DOCUMENTS

| | | | |
|---|---|---|---|
| 7,525,261 B2* | 4/2009 | Van Zundert | H05B 41/2886 315/209 R |
| 8,903,263 B2* | 12/2014 | Matsumoto | G03G 15/5004 323/282 |
| 2006/0171182 A1* | 8/2006 | Siri | H02M 3/33592 363/131 |
| 2008/0037295 A1* | 2/2008 | Suzuki | H02H 7/1227 363/40 |
| 2008/0061755 A1 | 3/2008 | Michishita | |
| 2008/0080219 A1 | 4/2008 | Sohma | |
| 2013/0279219 A1* | 10/2013 | Oki | H02M 1/32 363/53 |

* cited by examiner

DC-DC CONVERTER HAVING A REVERSE FLOW PROTECTION FUNCTION

This application is the U.S. national stage of PCT/JP2016/086589 filed Dec. 8, 2016, which claims priority of Japanese Patent Application No. JP 2015-253741 filed Dec. 25, 2015.

TECHNICAL FIELD

The present invention relates to a DC-DC converter.

BACKGROUND

JP 2009-5555A discloses an example of a DC-DC converter that performs voltage conversion by driving switching elements. According to the technology disclosed in JP 2009-5555A, in a step-down DC-DC converter that is provided with a plurality of voltage step-down units, a current value is obtained from the high-voltage side and the low-voltage side of a switching element in each voltage step-down unit. Then, whether or not a failure has occurred is monitored by continuously determining whether or not a difference from among the current values is greater than a predetermined value. Upon a failure being detected, the output is limited in order to prevent a non-faulty voltage step-down unit from being overloaded.

In this type of a DC-DC converter, there is the possibility of a current flowing in a reverse direction on the output side. If such a reverse flow occurs, it is preferable that conduction through the reverse flow path can be immediately blocked. However, in the DC-DC converter according to JP 2009-5555A, countermeasures are not taken against such a reverse flow.

Figure 3:
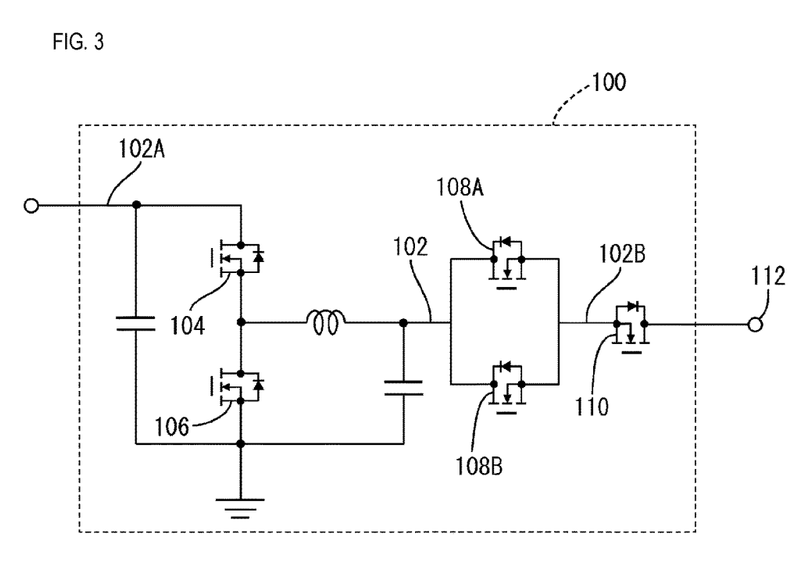
FIG. 3 is a circuit diagram schematically illustrating a DC-DC converter according to a comparative example.

The configuration shown in FIG. 3 is an example of the configuration of a DC-DC converter that can block a current when a reverse flow is generated. A DC-DC converter 100 shown in FIG. 3 is an example of a step-down DC-DC converter, and is configured to step down a DC voltage applied to an input line 102A on the primary side, by operating a MOSFET 104 on the high side and a MOSFET 106 on the low side using a synchronous rectification method, and to output the resulting voltage to an output line 102B on the secondary side. The DC-DC converter 100 monitors a current flowing through the secondary-side output line 102B, using a current detection unit (not shown). If a current flows in a reverse direction, the DC-DC converter 100 performs control to block a switching element 110 for protection.

However, in the step-down DC-DC converter 100 shown in FIG. 3, a current flowing through the output line 102B on the secondary side (the low-voltage side) is larger than a current flowing through the input line 102A on the primary side (the high-voltage side). Therefore, if, as in the configuration shown in FIG. 3, the switching element 110 for protection is provided on a path on the secondary side (the low-voltage side) through which a large current flows, conduction loss in the switching element 110 increases, and the amount of heat generated due to the conduction loss also increases.

The present invention has been made in view of the above-described situation, and aims to realize a DC-DC converter that is provided with a reverse flow protection function, while reducing conduction loss.

SUMMARY

A DC-DC converter according to the present invention includes a power supply conductive path that includes a first conductive path on an input side and a second conductive path on an output side; a reference conductive path that is maintained at a reference potential that is lower than a potential of the power supply conductive path; a voltage conversion unit that includes a first switching element, is provided between the first conductive path and the second conductive path, steps down a voltage applied to the first conductive path, by turning ON and OFF the first switching element, and outputs the resulting voltage to the second conductive path; a reverse flow state detection that detects a reverse flow state of a current flowing through the second conductive path; a second switching element that is provided on a third conductive path that is located between the voltage conversion unit and the reference conductive path, and switches to an OFF state in which the second switching element blocks conduction through the third conductive path, and an ON state in which the second switching element releases the blocking; and a reverse flow protection control unit that switches the second switching element to an OFF state upon the reverse flow state detection unit detecting a reverse flow state; a potential difference detection unit that detects a potential difference between two ends of the second switching element on the third conductive path, or a potential difference between two ends of a plurality of elements that include the second switching element; a third switching element that is provided on the first conductive path, and switches to an OFF state in which the third switching element blocks conduction through the first conductive path, and an ON state in which the third switching element releases the blocking. Wherein the a control unit switches the third switching element to an OFF state if a potential difference detected by the potential difference detection unit is greater than or equal to a predetermined threshold value.

Advantageous Effects of Invention

With this configuration, it is possible to block a current flowing through the third conductive path that is located between the voltage conversion unit and the reference conductive path when a current flows through the second conductive path in a reverse direction. Thus, it is possible to block conduction through the path of a current flowing from the second conductive path to the reference conductive path via the third conductive path (the reverse flow path), and prevent a reverse flow. In addition, the third conductive path, on which the second switching element is provided, is a path where the amount of current is smaller than that in the second conductive path (the low-voltage side of the power supply conductive path), and therefore it is possible to reduce conduction loss and the amount of heat generation compared to a configuration in which a similar switching element is located on the second conductive path to achieve reverse flow protection.

Also, it is possible to grasp the state of a current flowing through the third conductive path (the path between the voltage conversion unit and the reference conductive path), using the second switching element or a plurality of elements that include the second switching element. In particular, some or all of the dedicated elements for current detection may be omitted. Therefore, it is possible to reduce an increase in the number of parts and an increase in loss caused by the dedicated elements.

As described above, the present invention realizes a DC-DC converter that is provided with a reverse flow protection function, while reducing conduction loss.

DETAILED DESCRIPTION OF PREFERRED EMBODIMENTS

The following illustrates desirable embodiments of the invention.

The present invention may further include: a short circuit state detection unit that detects a short circuit state of the power supply conductive path; a third switching element that is provided on the first conductive path, and switches to an OFF state in which the third switching element blocks conduction through the first conductive path, and an ON state in which the third switching element releases the blocking; and a short circuit protection control unit that switches the third switching element to an OFF state upon the short circuit state detection unit detecting a short circuit state of the power supply conductive path.

With this configuration, it is possible to block a current flowing through the power supply conductive path to protect a circuit upon the power supply conductive path entering a short circuit state. In addition, since the third switching element for blocking a current flowing through the power supply conductive path is provided on the high-voltage side (the first conductive path side) of the power supply conductive path where the amount of a current is relatively small, it is possible to achieve short circuit protection while reducing conduction loss and the amount of heat generation. Furthermore, with this configuration, the third switching element is located on the first conductive path on the high-voltage side, and the second switching element is located on the third conductive path that is close to the reference conductive path. That is, in addition to reducing the amount of heat generated by each switching element, it is possible to disperse the switching elements that generate heat, and therefore it is possible to more effectively reduce an increase in local temperature rise.

In the present invention, the second conductive path may be a path that is electrically connected to the power supply unit. Also, the present invention may further include a fourth switching element that is provided on the third conductive path and switches to an OFF state in which the fourth switching element blocks conduction through the third conductive path and an ON state in which the fourth switching element releases the blocking, the fourth switching element switching to an ON state when the power supply unit is in a regular connection state, and switching to an OFF state when the power supply unit is in a reverse connection state.

With this configuration, it is possible to block a current flowing through the third conductive path located between the voltage conversion unit and the reference conductive path upon the power supply unit that is electrically connected to the output-side conductive path (the second conductive path) entering a reverse connection state. Therefore, in the event of such reverse connection, it is possible to prevent a current from flowing from the reference conductive path to the power supply unit that is connected the wrong way round, via the second conductive path. In addition, the third conductive path, on which the fourth switching element is provided, is a path where the amount of current is smaller than that in the second conductive path, and therefore it is possible to reduce conduction loss and the amount of heat generation compared to a configuration in which a similar switching element is located on the second conductive path to achieve reverse connection protection.

In the present invention, the third switching element may be inserted into the first conductive path between the primary-side power supply unit and the voltage conversion unit. Also, in the present invention, a capacitor such as a ceramic capacitor may be provided whose one electrode is connected to the conductive path between the third switching element and the voltage conversion unit, and whose other electrode is connected to the third conductive path.

If a capacitor is located in this way, it is possible to realize a configuration that can address a short circuit failure occurred in the capacitor, while enjoying the effects of the capacitor. For example, if the present invention is configured such that whether or not an excessive current has occurred in the path between the voltage conversion unit and the reference conductive path is determined, and the third switching element is blocked if an overcurrent state has occurred, it is possible to switch the path between the primary-side power supply unit and the capacitor to a non-conductive state when a short circuit failure has occurred in the capacitor, and it is possible to block an excessive current flowing from the primary-side power supply unit to the reference conductive path via the capacitor when a short circuit failure has occurred in the capacitor.

First Embodiment

The following describes a first embodiment, which is a specific example of the present invention.

Figure 1:
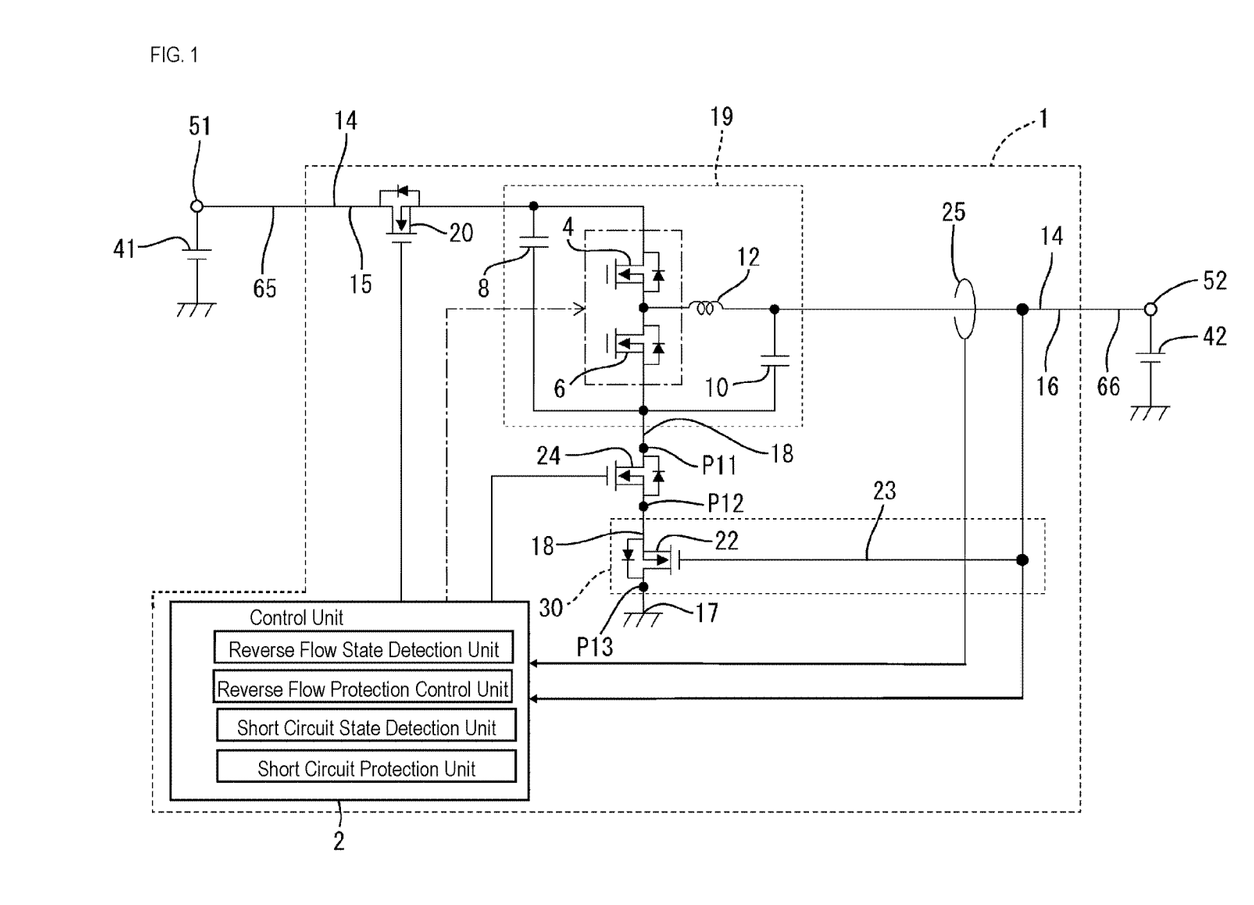
FIG. 1 is a circuit diagram schematically illustrating a DC-DC converter according to a first embodiment.

A DC-DC converter 1 shown in FIG. 1 is configured as an on-board step-down DC-DC converter, for example, and is configured to step down a DC voltage applied to a conductive path on the input side (a first conductive path 15), and to output the resulting voltage to a conductive path on the output side (a second conductive path 16).

The DC-DC converter 1 is provided with a power supply conductive path 14 that includes the first conductive path 15 and the second conductive path 16 and that serves as a power supply line, and a reference conductive path 17 that is maintained at a constant reference potential (a ground potential) that is lower than the potential of the power supply conductive path 14. The power supply conductive path 14 is divided into the first conductive path 15 and the second conductive path 16. The first conductive path 15 on the input side is connected to an external high-voltage side conductive path 65, and the second conductive path 16 on the output side is connected to an external low-voltage side conductive path 66. The high-voltage side conductive path 65 is connected to a positive terminal of a primary-side power supply unit 41 described below. The low-voltage side conductive path 66 is connected to a positive terminal of a secondary-side power supply unit 42 described below. A voltage conversion unit 19 that generates an output voltage to be applied to the second conductive path 16 by stepping down an input voltage applied to the first conductive path 15 is provided between the first conductive path 15 and the second conductive path 16.

The first conductive path 15 is configured as a primary side (high-voltage side) power supply line to which a relatively high voltage is applied. The first conductive path 15 is electrically connected to a high-potential side terminal of the primary-side power supply unit 41 via the high-voltage side conductive path 65, and a predetermined DC voltage from the primary-side power supply unit 41 that is electrically connected thereto is applied to the first conductive path 15. In the example shown in FIG. 1, the external high-voltage side conductive path 65 is provided between the high-potential side terminal of the primary-side power supply unit 41 and the first conductive path 15. However, the first conductive path 15 may extend to this position.

The primary-side power supply unit 41 is constituted by a power storage means such as a lithium ion battery or an electrical double-layer capacitor, and generates a first predetermined voltage. For example, the high-potential side terminal of the primary-side power supply unit 41 is maintained at 48 V, and the low-potential side terminal of the same is maintained at the ground potential (0 V). Note that, in the example shown in FIG. 1, a state in which a terminal 51 that is electrically connected to the first conductive path 15 is connected to the positive terminal of the primary-side power supply unit 41 is a regular connection state of the primary-side power supply unit 41.

The second conductive path 16 is configured as a secondary side (low-voltage side) power supply line to which a relatively low voltage is applied. The second conductive path 16 is electrically connected to a high-potential side terminal of a secondary-side power supply unit 42 via the low-voltage side conductive path 66, for example, and a DC voltage, which is lower than the output voltage from the primary-side power supply unit 41, from the secondary-side power supply unit 42, which is electrically connected to the second conductive path 16, is applied to the second conductive path 16. In the example shown in FIG. 1, the external low-voltage side conductive path 66 is provided between the high-potential side terminal of the secondary-side power supply unit 42 and the second conductive path 16. However, the second conductive path 16 may extend to this position.

The secondary-side power supply unit 42 is an example of the power supply unit, and is constituted by a power storage means such as a lead-acid battery, a lithium ion battery, or a lithium ion capacitor. The secondary-side power supply unit 42 generates a second predetermined voltage that is lower than the first predetermined voltage generated by the primary-side power supply unit 41. For example, the high-potential side terminal of the secondary-side power supply unit 42 is maintained at 12 V, and the low-potential side terminal of the same is maintained at the ground potential (0 V). Note that, in the example shown in FIG. 1, a state in which a terminal 52 that is electrically connected to the second conductive path 16 is connected to the positive terminal of the secondary-side power supply unit 42 is a regular connection state of the secondary-side power supply unit 42.

The reference conductive path 17 is formed as a ground, and is maintained at a constant ground potential (0 V). The low-potential side terminal of the primary-side power supply unit 41 and the low-potential side terminal of the secondary-side power supply unit 42 are electrically connected to the reference conductive path 17, and the drain of a switching element 22 described below is also connected to the reference conductive path 17.

The voltage conversion unit 19 is provided between the first conductive path 15 and the second conductive path 16, and includes a high-side switching element 4 that is configured as a MOSFET, and a low-side switching element 6 that is also configured as a MOSFET. The voltage conversion unit 19 also includes an input-side capacitor 8, an output-side capacitor 10, and a coil 12. The high-side switching element 4 is a switching element that turns on and off the input DC voltage from the first conductive path 15, and is equivalent to the first switching element.

In the voltage conversion unit 19, the first conductive path 15, which is a portion of the power supply conductive path 14, is connected to the drain of the high-side switching element 4. The drain of the switching element 4 is electrically connected to the electrode of the input-side capacitor 8 on one side, and when a switching element 20, which is inserted into the first conductive path 15, is in an ON state, the drain is also connected to the high-potential side terminal of the primary-side power supply unit 41. Also, the drain of the low-side switching element 6 and one end of the coil 12 are connected to the source of the switching element 4. A driving signal and a non-driving signal from a control unit 2, which includes a microcomputer and a driving circuit, are input to the gate of the switching element 4, and the switching element 4 switches between an ON state and an OFF state in response to a signal from the control unit 2.

The respective electrodes of the input-side capacitor 8 and the output-side capacitor 10 on the other side are connected to the source of the low-side switching element 6. The source of the switching element 6 and the respective electrodes of the input-side capacitor 8 and the output-side capacitor 10 on the other side are electrically connected to each other, and they are connected to a third conductive path 18. A driving signal and a non-driving signal from the control unit 2 are also input to the gate of the low-side switching element 6, and the switching element 6 switches between an ON state and an OFF state in response to a signal from the control unit 2.

In the voltage conversion unit 19, the other end of the coil 12 is connected to the second conductive path 16, which is an output-side power supply line, and the other end of the coil 12 is electrically connected to one electrode of the output-side capacitor 10.

The voltage conversion unit 19 with such a configuration serves as a synchronous rectification type step-down converter, and switches the switching element 4 to ON and OFF in synchronization with OFF and ON operations of the switching element 6. Under the control of the control unit 2, the voltage conversion unit 19 alternately switches to a first state, in which the switching element 4 is in an ON state and the switching element 6 is in an OFF state, and to a second state, in which the switching element 4 is in an OFF state and the switching element 6 is in an ON state, and thus the voltage conversion unit 19 steps down a DC voltage applied to the first conductive path 15, and outputs the resulting voltage to the second conductive path 16. Note that the output voltage from the second conductive path 16 is determined according to the duty ratio of a PWM signal that is given to the gate of the switching element 4. During a normal operation, the switching element 20, the switching element 22, and the switching element 24 are all maintained in an ON state.

The configuration above is the basic configuration of the DC-DC converter 1, and the DC-DC converter 1 performs a step-down operation according to well-known technology. Upon an abnormality occurring in the DC-DC converter 1, an element corresponding to the type of the abnormality, from among the switching element 20, the switching element 22, and the switching element 24, is switched to an OFF state so that the DC-DC converter 1 can be protected.

Next, a configuration that is relevant to reverse flow protection will be described.

A current detection unit 25 for detecting a current flowing through the second conductive path 16 is provided in the DC-DC converter 1. Although the current detection unit 25 in FIG. 1 is shown only schematically, various well-known current detection circuits may be employed as the current detection unit 25. For example, the current detection unit 25 may include a shunt resistor that is inserted into the second conductive path 16, and a detection circuit that detects a voltage across the shunt resistor. The detection circuit outputs, to the control unit 2, the potentials at the two ends of the shunt resistor, or a value that indicates the potential difference between the two ends (a value corresponding to a current value).

Then, the control unit 2 specifies the magnitude of a current flowing through the second conductive path 16, based on the current value from the current detection unit 25. Furthermore, the control unit 2 specifies whether the direction in which a current flowing through the second conductive path 16 is a first direction from the voltage conversion unit 19 to the secondary-side power supply unit 42 or a second direction from the secondary-side power supply unit 42 to the voltage conversion unit 19. A state in which the direction of a current is the first direction is a normal state, and a state in which the direction of a current is the second direction is a reverse flow state. The current detection unit 25 and the control unit 2 constitute an example of the reverse flow state detection unit, and function to detect a reverse flow state of a current flowing through the second conductive path 16.

The third conductive path 18 is provided with the switching element 24. The switching element 24 is an example of the second switching element, and is configured to switch to an OFF state, in which the switching element 24 blocks conduction through the third conductive path 18, and to an ON state, in which the switching element 24 releases the blocking.

While the voltage conversion unit 19 is operating, the control unit 2 continuously outputs an ON signal to the gate of the switching element 24 as long as it detects that the direction of a current flowing through the second conductive path 16 is "the first direction" above (i.e. as long as it detects that the direction of the current is in a normal state). That is, the switching element 24 is maintained in an ON state while the direction of a current flowing through the second conductive path 16 is in a normal state, and the third conductive path 18 between the voltage conversion unit 19 and the reference conductive path 17 is conductive as long as the switching element 22 is in an ON state. In contrast, the control unit 2 outputs an OFF signal to the gate of the switching element 24 upon detecting that the direction of a current flowing through the second conductive path 16 is "the second direction" above (i.e. upon detecting that the direction of a current flow is in a reverse flow state). Thus, the switching element 24 is switched to an OFF state upon the direction of a current flowing through the second conductive path 16 changing to the reverse direction. Consequently, the third conductive path 18 between the voltage conversion unit 19 and the reference conductive path 17 is brought into a non-conductive state, and a current flowing between them is blocked. That is, the path of a current flowing from the secondary-side power supply unit 42 to the reference conductive path 17 via the third conductive path 18 (a reverse flow path) is blocked, and such a current is prevented from flowing.

Note that the control unit 2 is an example of the reverse flow protection control unit, and functions to switch the switching element 24 (the second switching element) to an OFF state upon the reverse flow state detection unit detecting a reverse flow state.

Next, a configuration that is relevant to short circuit protection will be described.

In this configuration, the current detection unit 25 and the control unit 2 function as the short circuit state detection unit, and detect a short circuit state that occurs in the power supply conductive path 14 by determining whether or not an excessive current has been generated in the second conductive path 16. Specifically, the control unit 2 detects a value Io of a current flowing through the second conductive path 16, based on an input value from the current detection unit 25, and compares the detected current value Io of the second conductive path 16 with a predetermined threshold value It. If Io≤It is satisfied, the control unit 2 determines that the power supply conductive path 14 is not in an overcurrent state, and if Io>It is satisfied, the control unit 2 determines that the power supply conductive path 14 is in an overcurrent state. Thus, the control unit 2 detects a short circuit state of the power supply conductive path 14.

The voltage across the second conductive path 16 is input to the control unit 2, and the control unit 2 also determines whether or not overvoltage has occurred in the second conductive path 16 to determine whether or not a short circuit state has occurred in the power supply conductive path 14. Specifically, the control unit 2 compares the detected voltage value Vo of the second conductive path 16 with a predetermined threshold value Vt. If Vo≤Vt is satisfied, the control unit 2 determines that the power supply conductive path 14 is not in an overvoltage state, and if Vo>Vt is satisfied, the control unit 2 determines that the power supply conductive path 14 is in an overvoltage state. Thus, the control unit 2 detects a short circuit state of the power supply conductive path 14.

On the other hand, the first conductive path 15 is provided with the switching element 20 for short circuit protection, which is configured as a MOSFET. The switching element 20 is an example of the third switching element, and is configured to switch to an OFF state, in which the switching element 20 blocks conduction through the first conductive path 15, and to an ON state, in which the switching element 20 releases the blocking, under the control of the control unit 2.

Specifically, while the control unit 2 is detecting that the current value Io of the second conductive path 16 is smaller than or equal to the threshold value It, and that the voltage value Vo of the second conductive path 16 is smaller than or equal to the threshold value Vt, an ON signal is continuously output from the control unit 2 to the gate of the switching element 20. In this way, while an ON signal is continuously input to the gate of the switching element 20 and the switching element 20 is maintained in an ON state (i.e. the period during which conduction is unblocked), a path between the primary-side power supply unit 41 and the voltage conversion unit 19 is in a conductive state, and a DC voltage that is generated in the primary-side power supply unit 41 is continuously input to the voltage conversion unit 19.

On the other hand, if the control unit 2 detects that the current value Io of the second conductive path 16 is greater than the threshold value It, or the voltage value Vo of the second conductive path 16 is greater than the threshold value Vt (i.e. if the control unit 2 detects that the power supply conductive path 14 is in a short circuit state), an OFF signal is output from the control unit 2 to the gate of the switching element 20. If an OFF signal is input to the gate of the switching element 20 in this way and the switching element 20 switches to the OFF state, the primary-side power supply unit 41 and the voltage conversion unit 19 on the first conductive path 15 are electrically disconnected from each other. If this is the case, the DC voltage generated in the primary-side power supply unit 41 is not input to the voltage conversion unit 19. Note that the control unit 2 is an example of the short circuit protection control unit, and functions to switch the switching element 20 (the third switching element) to an OFF state upon the short circuit state detection unit detecting that the power supply conductive path 14 is in a short circuit state. In this way, in the configuration shown in FIG. 1, the switching element 20 switches to an OFF state upon the power supply conductive path 14 entering a short circuit state. Therefore, the switching element 20 can protect a circuit by blocking a current flowing through the power supply conductive path 14.

Next, a configuration that is relevant to reverse connection protection will be described.

The DC-DC converter 1 in FIG. 1 includes a reverse connection protection circuit unit 30. The DC-DC converter 1 is configured to block conduction through the third conductive path 18 when the secondary-side power supply unit 42 is connected the wrong way round, to prevent a current from flowing to the secondary side in the event of reverse connection. The reverse connection protection circuit unit 30 includes the switching element 22 for reverse connection protection, which is located on the conductive path (the third conductive path 18) between the voltage conversion unit 19 and the reference conductive path 17, and a fourth conductive path 23 that maintains the gate potential of the switching element 22 at the potential of the second conductive path 16. The switching element 22 is an example of the fourth switching element, and is configured to switch to an OFF state, in which the switching element 22 blocks conduction through the third conductive path 18 (specifically, the switching element 22 blocks a current flowing from the reference conductive path 17 to the voltage conversion unit 19), and to an ON state, in which the switching element 22 releases the blocking.

In the reverse connection protection circuit unit 30, the switching element 22 is switched to an ON state when the terminals of at least the secondary-side power supply unit 42 (the low-voltage side power supply unit) are in a regular connection state as shown in FIG. 1. In this case, the gate potential of the switching element 22 is substantially equal to the potential of the positive electrode of the secondary-side power supply unit 42 (e.g. 12 V), and the gate potential is maintained to be higher than the source potential. Thus, the switching element 22 is maintained in an ON state. Then, as long as the switching element 24 is in an ON state, the source of the low-side switching element 6, the input-side capacitor 8, and the output-side capacitor 10 are maintained in a conductive state in which they are electrically connected to the reference conductive path 17.

In contrast, when the terminals of the secondary-side power supply unit 42 (the low-voltage side power supply unit) are in a reverse connection state in which the positive and the negative are connected the wrong way round, the gate potential of the switching element 22 is substantially the same as the potential of the negative electrode of the secondary-side power supply unit 42 (e.g. −12 V), and the gate potential is maintained to be lower than the source potential. Therefore, the switching element 22 is maintained in an OFF state. When the switching element 22 is in an OFF state, the source of the switching element 6, the input-side capacitor 8, and the output-side capacitor 10 are not electrically connected to the reference conductive path 17. Also, in the configuration shown in FIG. 1, even when the path between the secondary-side power supply unit 42 and the second conductive path 16 is in an open state, the switching element 22 is maintained in an OFF state. Such a configuration realizes reverse connection protection.

The following describes the effects of this configuration.

With this configuration, it is possible to block a current flowing through the third conductive path 18 that is located between the voltage conversion unit 19 and the reference conductive path 17 when a current flows through the second conductive path 16 in a reverse direction. Thus, it is possible to block conduction through the path of a current flowing from the second conductive path 16 to the reference conductive path 17 via the third conductive path 18 (the reverse flow path), and prevent a reverse flow. In addition, the third conductive path 18, on which the switching element 24 (the second switching element) is provided, is a path where the amount of current is smaller than that in the second conductive path 16 (the low-voltage side of the power supply conductive path), and therefore it is possible to reduce conduction loss and the amount of heat generation compared to a configuration in which a similar switching element is located on the second conductive path 16 to achieve reverse flow protection.

Furthermore, with this configuration, it is possible to block a current flowing through the power supply conductive path 14 to protect a circuit upon the power supply conductive path 14 entering a short circuit state. In addition, since the switching element 20 (the third switching element) for blocking a current flowing through the power supply conductive path 14 is provided on the high-voltage side (the first conductive path 15) of the power supply conductive path 14 where the amount of a current is relatively small, it is possible to achieve short circuit protection while reducing conduction loss and the amount of heat generation. In addition, the switching element 20 (the third switching element) is located on the first conductive path 15 on the high-voltage side and the switching element 24 (the second switching element) is located on the third conductive path 18 that is close to the reference conductive path 17, and thus the switching elements are dispersed. That is, in addition to reducing the amount of heat generated by each switching element, it is possible to disperse the switching elements that generate heat, and therefore it is possible to more effectively reduce a local temperature rise.

Furthermore, with this configuration, if the secondary-side power supply unit 42 (the power supply unit) that is connected to the output-side conductive path (the second conductive path 16) is in a reverse connection state, it is possible to block a current flowing through the third conductive path 18 located between the voltage conversion unit 19 and the reference conductive path 17. Therefore, in the event of such reverse connection, it is possible to prevent a current from flowing from the reference conductive path 17 to the secondary-side power supply unit 42 (the power supply unit) that is connected the wrong way round, via the second conductive path 16. In addition, the third conductive path 18, on which the switching element 22 (the fourth switching element) is provided, is a path where the amount of current is smaller than that in the second conductive path 16, and therefore it is possible to reduce conduction loss and the amount of heat generation compared to a configuration in which a similar switching element is located on the second conductive path 16 to achieve reverse connection protection.

Furthermore, in this configuration, the switching element 20 (the third switching element) is inserted into the first conductive path 15 between the primary-side power supply unit 41 and the voltage conversion unit 19. Also, this configuration is provided with a capacitor 8 such as a ceramic capacitor that is configured such that one electrode is connected to the conductive path between this switching element 20 and the voltage conversion unit 19, and the other electrode is connected to the third conductive path 18. If the capacitor 8 is located in this way, it is possible to realize a configuration that can achieve effects that are produced by the capacitor 8, while making it possible to address a short circuit failure occurred in the capacitor 8. For example, if whether or not an excessive current has occurred in the path between the voltage conversion unit 19 and the reference conductive path 17 is determined, and the switching element 20 is blocked if an overcurrent state has occurred, it is possible to switch the path between the primary-side power supply unit 41 and the capacitor 8 to a non-conductive state when a short circuit failure has occurred in the capacitor 8, and it is possible to block an excessive current flowing from the primary-side power supply unit 41 to the reference conductive path 17 via the capacitor 8 when a short circuit failure has occurred in the capacitor 8.

In this configuration, the switching element 20 (the third switching element) is inserted into the first conductive path 15 between the primary-side power supply unit 41 and the voltage conversion unit 19. It is possible to add a voltage detection function (not shown) to this configuration to detect that a voltage that is higher than a predetermined threshold voltage is applied to the first conductive path 15. The switching element 20 (the third switching element) may be switched to an OFF state under the control of the control unit 2 when a voltage that is higher than the predetermined voltage is applied to the first conductive path 15. With this configuration, it is possible to prevent a voltage that is higher than the threshold voltage from being applied to elements that are downstream of the switching element 20 (the third switching element), and therefore it is possible to lower the withstand voltage of the downstream elements.

Next, advantageous effects that can be achieved using the configuration shown in FIG. 1 will be specifically described in comparison with the comparative example shown in FIG. 3.

In the following comparative description, it is assumed that the step-down ratio is 1/4 in both FIG. 1 and FIG. 3, in order to make a comparison under the same conditions. It is also assumed that, in both the DC-DC converter 1 shown in FIG. 1 and the DC-DC converter 100 shown in FIG. 3 as a comparative example, a current of approximately 200 A flows on the secondary side (the low-voltage side), a current of approximately 50 A flows on the primary-side (the high-voltage side), and a current of approximately 150 A flows through the path between the voltage conversion unit and the ground (the third conductive path 18 in FIG. 1 and the corresponding conductive path in FIG. 3). Since the withstand voltage required for elements are different on the primary-side, the secondary-side, and the ground side, it is assumed that the switching elements located on the primary-side have a withstand voltage of 80 V and an ON resistance of 5 mΩ, and the switching elements located on the secondary-side and the ground side have a withstand voltage of 40 V and an ON resistance of 2 mΩ. However, in the comparative example shown in FIG. 3, if the switching element 104 on the high-side breaks down in an ON state, a primary-side voltage is applied to switching elements 108A and 108B, and therefore the switching elements 108A and 108B are required to have a withstand voltage that is as high as that of the switching elements on the primary-side. Therefore, the switching elements 108A and 108B have a withstand voltage of 80 V and an ON resistance of 5 mΩ.

First, a loss reduction effect will be described.

If attention is paid to reverse flow protection, in the DC-DC converter 100 shown in FIG. 3, the ON resistance of the switching element 110 for reverse flow protection is 2 mΩ, and therefore a conductive loss in the switching element 110 is approximately 80 W. In contrast, in the configuration shown in FIG. 1, the ON resistance of the switching element 24 for reverse flow protection is 2 mΩ, and therefore conduction loss in the switching element 24 is approximately 45 W. In this way, if attention is paid to reverse flow protection, the configuration according to the first embodiment shown in FIG. 1 can further reduce conduction loss, and increase the loss reduction effect.

When attention is paid to short circuit protection and reverse connection protection, in the DC-DC converter 100 shown in FIG. 3, the ON resistance of the switching elements 108A and 108B for both short circuit protection and reverse connection protection is 5 mΩ, and the switching elements 108A and 108B are arranged in parallel. Therefore, conductive loss in the switching elements 108A and 108B is approximately 100 W. That is, the total of losses in the elements for short circuit protection and reverse connection protection is approximately 100 W. In contrast, in the configuration shown in FIG. 1, the ON resistance of the switching element 20 for short circuit protection is 5 mΩ, and therefore conduction loss in the switching element 20 is approximately 12.5 W. Similarly, the ON resistance of the switching element 22 for reverse connection protection is 2 mΩ, and therefore conduction loss in the switching element 22 is approximately 45 W. That is, the total of losses in the elements for short circuit protection and reverse connection protection is approximately 57.5 W. In this way, even if attention is paid to short circuit protection and reverse flow protection, the configuration according to the first embodiment shown in FIG. 1 can further reduce conduction loss, and the loss reduction effect increases. Thus, the loss reduction effect of the entire apparatus further increases.

Next, a heat source dispersion effect will be described.

In the DC-DC converter 100 shown in FIG. 3, a loss in the switching elements 108A and 108B is 100 W, conduction loss in the switching element 110 is approximately 80 W, and therefore a total conduction loss of approximately 180 W is generated on the secondary-side. That is, heat that corresponds to 180 W is locally generated in the power supply line on the secondary-side. In contrast, in the DC-DC converter 1 shown in FIG. 1, the switching element 24, in which conduction loss of approximately 45 W is caused, and the switching element 22, in which conduction loss of approximately 45 W is caused, are located on the third conductive path 18. The switching element 20, in which conduction loss of approximately 12.5 W is caused, is located on the first conductive path 15. In this way, in addition to reducing the amount of heat generated by the entire apparatus, it is possible to more effectively reduce a local temperature rise by dispersing the elements. Consequently, it is easier to achieve additional effects such as simplification of heat dissipation mechanism.

Second Embodiment

Next, a second embodiment will be described, mainly with reference to FIG. 2.

Figure 2:
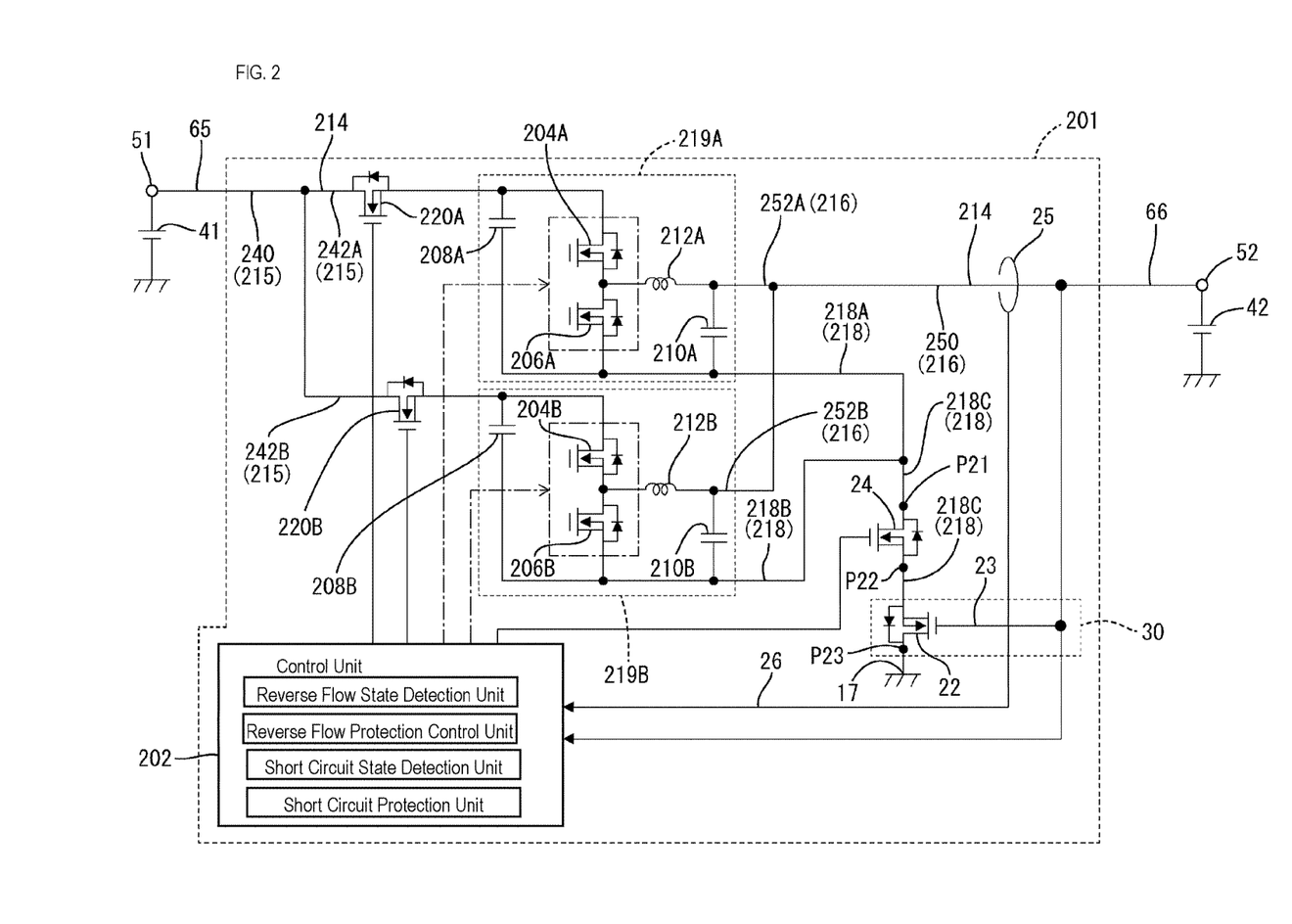
FIG. 2 is a circuit diagram schematically illustrating a DC-DC converter according to a second embodiment.

A DC-DC converter 201 shown in FIG. 2 is different from the DC-DC converter 1 according to the first embodiment in terms of circuit configuration, mainly in that the DC-DC converter 201 is of a multiphase type. Note that, in the following description, components that are the same as those of the DC-DC converter 1 according to the first embodiment are given reference numerals that are the same as those given to the DC-DC converter 1 shown in FIG. 1, and detailed descriptions of the same components will be omitted.

The DC-DC converter 201 in FIG. 2 includes a power supply conductive path 214 that is a path through which an input and output current flows, and the reference conductive path 17 that is maintained at a constant reference potential (a ground potential) that is lower than the potential of the power supply conductive path 214. A plurality of voltage conversion units 219A and 219B are provided in parallel between a first conductive path 215 and a second conductive path 216 that constitute the power supply conductive path 214. The voltage conversion units 219A and 219B generate an output voltage that is to be applied to the second conductive path 216, by stepping down an input voltage applied to the first conductive path 215.

The first conductive path 215 is configured as a primary-side (high-voltage side) power supply line to which a relatively high voltage is applied. The first conductive path 215 is electrically connected to the high-potential side terminal of the primary-side power supply unit 41, and a predetermined DC voltage (e.g. 48 V) from the primary-side power supply unit 41 is applied to the first conductive path 215. The first conductive path 215 includes a shared input path 240 that is electrically connected to the high-potential side terminal of the primary-side power supply unit 41, and a plurality of individual input paths 242A and 242B that branch off from the shared input path 240. The plurality of individual input paths 242A and 242B are respectively connected to the plurality of voltage conversion units 219A and 219B.

The second conductive path 216 is configured as a secondary-side (low-voltage side) power supply line to which a relatively low voltage is applied. The second conductive path 216 is electrically connected to the high-potential side terminal of the secondary-side power supply unit 42, and a predetermined DC voltage (e.g. 12 V) from the secondary-side power supply unit 42, which is lower than the output voltage from the primary-side power supply unit 41, is applied to the second conductive path 216. The second conductive path 216 includes a plurality of individual output paths 252A and 252B that are respectively connected to the plurality of voltage conversion units 219A and 219B, and a shared output path 250 to which the individual output paths 252A and 252B are commonly connected, and which is electrically connected to the high-potential side terminal of the secondary-side power supply unit 42.

The reference conductive path 17 is formed as a ground, and is maintained at a constant ground potential (0 V). Also in the configuration shown in FIG. 2, the low-potential side terminal of the primary-side power supply unit 41 and the low-potential side terminal of the secondary-side power supply unit 42 are connected to the reference conductive path 17, and furthermore, the drain of the switching element 22 is connected to the reference conductive path 17.

The voltage conversion units 219A and 219B serve as synchronous rectification type step-down converters. The voltage conversion unit 219A includes switching elements 204A and 206A, an input-side capacitor 208A, an output-side capacitor 210A, and a coil 212A. The voltage conversion unit 219B includes switching elements 204B and 206B, an input-side capacitor 208B, an output-side capacitor 210B, and a coil 212B. The switching elements 204A and 204B respectively on the high side of the voltage conversion units 219A and 219B are switching elements that individually turn ON and OFF an input DC voltage applied to the first conductive path 215, and are equivalent to the first switching element.

In the voltage conversion unit 219A, the respective electrodes of the input-side capacitor 208A and the output-side capacitor 210A are connected to the source of the low-side switching element 206A. In the voltage conversion unit 219B, the respective electrodes of the input-side capacitor 208B and the output-side capacitor 210B are connected to the source of the low-side switching element 206B. The sources of the switching elements 206A and 206B, the respective electrodes of the input-side capacitors 208A and 208B, and the respective electrodes of the output-side capacitor 210A and 210B are electrically connected to each other, and are connected to a shared conductive path 218C.

The switching element 206A, the input-side capacitor 208A, and the output-side capacitor 210A are connected to a conductive path 218A that is a portion of the third conductive path 218. The switching element 206B, the input-side capacitor 208B, and the output-side capacitor 210B are connected to a conductive path 218B that is a portion of the third conductive path 218. The conductive paths 218A and 218B are connected to the shared conductive path 218C that is a portion of the shared conductive path 218C. The switching element 24 and the switching element 22 are connected to the shared conductive path 218C in series.

The far end of the coil 212A in the voltage conversion unit 219A is connected to one electrode of the output-side capacitor 210A, and to the shared output path 250 via the individual output path 252A. The far end of the coil 212B in the voltage conversion unit 219B is connected to one electrode of the output-side capacitor 210B, and to the shared output path 250 via the individual output path 252B.

The configuration above is the basic configuration of the DC-DC converter 201, and the DC-DC converter 201 performs a step-down operation, using the two voltage conversion units 219A and 219B. One of the voltage conversion units, namely the voltage conversion unit 219A, steps down the DC voltage applied to the first conductive path 215, by performing an operation to turn ON and OFF the switching element 204A in response to a signal from a control unit 202, and performing an operation to turn ON and OFF the switching element 206A in synchronization with the aforementioned operation, and outputs the resulting voltage to the second conductive path 216. The same applies to the other voltage conversion unit, namely the voltage conversion unit 219B. The voltage conversion unit 219B steps down the DC voltage applied to the first conductive path 215, by performing an operation to turn ON and OFF the switching element 204B in response to a signal from the control unit 202, and performing an operation to turn ON and OFF the switching element 206B in synchronization with the aforementioned operation, and outputs the resulting voltage to the second conductive path 216. Note that the timing at which a driving signal is supplied to the two voltage conversion units 219A and 219B is not specifically limited. For example, the voltage conversion unit 219A and the voltage conversion unit 219B may be operated by using a well-known control method so as to be out of phase. During a normal step-down operation, the switching elements 220A and 220B, the switching element 22, and the switching element 24 are all maintained in an ON state.

The DC-DC converter 201 shown in FIG. 2 also has the same reverse connection protection function as in the first embodiment. Specifically, the current detection unit 25 and the control unit 202 function in the same manner as the reverse flow state detection unit in the first embodiment, to detect a reverse flow of a current flowing through the second conductive path 216. The control unit 202 functions in the same manner as the reverse flow protection control unit in the first embodiment, and switches the switching element 24

(the second switching element) to an OFF state upon the reverse flow state detection unit detecting a reverse flow state.

The DC-DC converter 201 shown in FIG. 2 also has the same short circuit protection function as in the first embodiment. Specifically, the current detection unit 25 and the control unit 202 function in the same manner as the short circuit state detection unit in the first embodiment, to detect a short circuit state of the power supply conductive path 214. The control unit 202 functions in the same manner as the short circuit protection control unit in the first embodiment, and switches the switching elements 220A and 220B (the third switching elements) to an OFF state upon the short circuit state detection unit detecting a short circuit state of the power supply conductive path 214. Upon detecting a short circuit state, the control unit 202 may switch all of the switching elements 220A and 220B to an OFF state, or specify a voltage conversion unit that is in a short circuit state, out of the plurality of voltage conversion units 219A and 219B, and switch only a switching element on the path that is in a short circuit state, out of the switching elements 220A and 220B, to an OFF state.

The DC-DC converter 201 shown in FIG. 2 also has the same reverse connection protection function as in the first embodiment. The reverse connection protection circuit unit 30 provided in the DC-DC converter 201 has the same configuration as the reverse connection protection circuit unit 30 of the DC-DC converter 1 shown in FIG. 1, and functions in the same manner.

Third Embodiment

Next, a third embodiment will be described.

In the first embodiment, the current detection unit 25 shown in FIG. 1 is used to detect a current, whereas, in the third embodiment, a component for detecting a current flowing through the switching element 24 is used instead of the current detection unit 25 or in addition to the current detection unit 25. Since the circuit configuration of the third embodiment is the same as that shown in FIG. 1, the following description will be provided with reference to FIG. 1.

Specifically, the switching element 24 functions as a shunt resistor, and a detection circuit (not shown) for detecting a voltage across the switching element 24 is provided. The detection circuit is configured to output, for example, a value that indicates potentials at two end positions P11 and P12 of the shunt resistor, or a potential difference between the two end positions P11 and P12, to the control unit 2. In this configuration, the control unit 2 is an example of the potential difference detection unit.

With this configuration, it is possible to grasp the state of a current flowing from the voltage conversion unit 19 to the third conductive path 18, using the switching element 24 (the second switching element). In particular, some or all of the dedicated elements for current detection may be omitted. Therefore, it is possible to reduce an increase in the number of parts and an increase in loss caused by the dedicated elements.

The control unit 2 can use the input value from the above-described detection circuit (the value indicating potentials at the two end positions P11 and P12, or a potential difference between the two end positions P11 and P12) for various purposes. For example, the control unit 2 may grasp the value of a current flowing through the switching element 24, based on the input value from the detection circuit, and switch the switching element 20 to an OFF state if the value of a current flowing through the switching element 24 is in a predetermined overcurrent state. For example, a potential difference across the switching element 24, i.e. the potential difference between the drain and the source of the switching element 24 may be detected, and when the potential difference across the switching element 24 is greater than or equal to a predetermined threshold value, it may be determined that a current flowing through the switching element 24 is in an overcurrent state and the switching element 20 may be switched to an OFF state. Alternatively, when the potential difference across the switching element 24 is greater than or equal to a predetermined threshold value, the switching element 24 may be switched to an OFF state or both the switching elements 20 and 24 may be switched to an OFF state. With such a configuration, it is possible to immediately block an excessive current flowing toward the ground when a short circuit failure has occurred in the switching element 4 or the switching element 6.

Other Embodiments

The present invention is not limited to the embodiments illustrated with reference to the descriptions above and the drawings, and, for example, the following embodiments are included in the technical scope of the present invention.

The primary-side power supply unit 41 and the secondary-side power supply unit 42 in the above-described embodiments are merely specific examples. The type of the power storage means and voltages to be generated are not limited to the examples above, and may be variously modified.

In the examples shown in FIGS. 1 and 2, a generator and a load that are connected to the first conductive path and the second conductive path are omitted. However, various devices and electronic parts may be connected to the first conductive path and the second conductive path.

In the second embodiment shown in FIG. 2, the switching element 24 for reverse flow protection is provided on the shared conductive path 218C. However, switching elements (the second switching elements) for reverse flow protection may be respectively provided on the conductive paths 218A and 218B that connect the voltage conversion units 219A and 219B to the shared conductive path 218C. If this is the case, all of the second switching elements may be brought into an OFF state when a reverse flow has occurred, or the path in which a reverse flow has occurred may be specified and the second switching element on the specified path may be brought into an OFF state.

In the second embodiment shown in FIG. 2, the switching elements 220A and 220B for short circuit protection are respectively provided on the plurality of individual input paths 242A and 242B. However, it is possible to reduce the number of elements by providing only one element on the shared input path 240.

In the second embodiment shown in FIG. 2, the DC-DC converter 201 that has a two-phase structure in which two voltage conversion units 219A and 219B are connected in parallel has been illustrated. However, the DC-DC converter 201 may have a three or more-phase structure in which three or more voltage conversion units are connected in parallel. Even in such a structure, a shared conductive path (the third conductive path) that connects the voltage conversion units and the reference conductive path may be provided, and the second switching element may be located on the third conductive path.

In the third embodiment, a configuration in which a shunt resistor is used as the switching element 24 (the second switching element) and a potential difference across the switching element 24 is detected has been described. However, a potential difference across a plurality of elements including the second switching element may be detected. For example, a configuration in which a detection circuit (not shown) outputs, to the control unit 2, a value that indicates potentials at two end positions P11 and P13 of the switching elements 22 and 24, or a potential difference between the two end positions P11 and P13, may be employed. When the potential difference between the two end positions P11 and P13 is greater than or equal to a threshold value, the control unit 2 may determine that a current flowing through the third conductive path 18 is in a overcurrent state, and perform the same protection operation as in the third embodiment (a protection operation to switch at least one of the switching elements 20 and 24 to an OFF state).

The same configuration as in the third embodiment may be added to the second embodiment shown in FIG. 2. For example, a configuration in which a detection circuit (not shown) outputs, to the control unit 202, a value that indicates potentials at two end positions P21 and P22 of the switching element 24, or a potential difference between the two end positions P21 and P22, may be employed. Also, a configuration in which the detection circuit outputs, to the control unit 202, a value that indicates potentials at two end positions P21 and P23 of the switching elements 22 and 24, or a potential difference between the two end positions P21 and P23, may be employed.

The invention claimed is:

1. A DC-DC converter comprising:
a power supply conductive path that includes a first conductive path on an input side and a second conductive path on an output side;
a reference conductive path that is maintained at a reference potential that is lower than a potential of the power supply conductive path;
a voltage conversion unit that includes a first switching element, is provided between the first conductive path and the second conductive path, converts a voltage applied to the first conductive path, by turning ON and OFF the first switching element, and outputs a resulting voltage to the second conductive path;
a reverse flow state detection that detects a reverse flow state of a current flowing through the second conductive path;
a second switching element that is provided on a third conductive path that is located between the voltage conversion unit and the reference conductive path, and switches to an OFF state in which the second switching element blocks conduction through the third conductive path, and an ON state in which the second switching element releases the blocking; and
a reverse flow protection control unit that switches the second switching element to the OFF state upon the reverse flow state detection unit detecting a reverse flow state;
a potential difference detection unit that detects a potential difference between two ends of the second switching element on the third conductive path, or a potential difference between two ends of a plurality of elements that include the second switching element;
a third switching element that is provided on the first conductive path, and switches to an OFF state in which the third switching element blocks conduction through the first conductive path, and an ON state in which the third switching element releases the blocking; and
a control unit that switches the third switching element to the OFF state if a potential difference detected by the potential difference detection unit is greater than or equal to a predetermined threshold value.

2. The DC-DC converter according to claim 1, further comprising: a short circuit state detection unit that detects a short circuit state of the power supply conductive path; and
a short circuit protection control unit that switches the third switching element to the OFF state upon the short circuit state detection unit detecting the short circuit state of the power supply conductive path.

3. The DC-DC converter according to claim 2,
wherein the second conductive path is a path that is electrically connected to a power supply unit, and
the DC-DC converter further comprises a reverse connection protection circuit unit that includes a fourth switching element that is provided on the third conductive path and switches to an OFF state in which the fourth switching element blocks conduction through the third conductive path and an ON state in which the fourth switching element releases the blocking, the fourth switching element switching to the ON state when the power supply unit is in a regular connection state, and switching to the OFF state when the power supply unit is in a reverse connection state.

4. The DC-DC converter according to claim 1,
wherein the second conductive path is a path that is electrically connected to a power supply unit, and
the DC-DC converter further comprises a reverse connection protection circuit unit that includes a fourth switching element that is provided on the third conductive path and switches to an OFF state in which the fourth switching element blocks conduction through the third conductive path and an ON state in which the fourth switching element releases the blocking, the fourth switching element switching to the ON state when the power supply unit is in a regular connection state, and switching to the OFF state when the power supply unit is in a reverse connection state.

* * * * *